United States Patent
Miyake

(10) Patent No.: US 7,764,616 B2
(45) Date of Patent: Jul. 27, 2010

(54) TRANSMITTER DEVICE FOR CONTROLLING DATA TRANSMISSION

(75) Inventor: Motoharu Miyake, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1495 days.

(21) Appl. No.: 10/994,713

(22) Filed: Nov. 22, 2004

(65) Prior Publication Data

US 2005/0117515 A1  Jun. 2, 2005

(30) Foreign Application Priority Data

Nov. 28, 2003  (JP)  ............................. 2003-399988

(51) Int. Cl.
*H04J 1/16* (2006.01)
(52) U.S. Cl. .................. 370/236; 370/229; 370/230; 370/235; 370/394
(58) Field of Classification Search .............. 370/235, 370/395.4, 231, 236, 229, 230, 394
See application file for complete search history.

(56) References Cited

U.S. PATENT DOCUMENTS

| | | | | |
|---|---|---|---|---|
| 4,203,167 A * | 5/1980 | Collins | ........................... | 2/322 |
| 4,726,027 A * | 2/1988 | Nakamura et al. | .......... | 714/748 |
| 6,038,606 A * | 3/2000 | Brooks et al. | ............... | 709/235 |
| 6,091,710 A * | 7/2000 | Mawhinney | ................. | 370/236 |
| 6,091,733 A * | 7/2000 | Takagi et al. | ................. | 370/401 |
| 6,118,765 A * | 9/2000 | Phillips | ....................... | 370/235 |
| 6,163,861 A * | 12/2000 | Yoshioka et al. | ............. | 714/712 |
| 6,317,430 B1 * | 11/2001 | Knisely et al. | ............... | 370/394 |
| 6,424,626 B1 * | 7/2002 | Kidambi et al. | .............. | 370/236 |
| 6,493,316 B1 * | 12/2002 | Chapman et al. | ............ | 370/231 |
| 6,611,495 B1 * | 8/2003 | Meyer et al. | .............. | 370/230.1 |
| 6,622,172 B1 * | 9/2003 | Tam | ........................... | 709/232 |
| 6,829,670 B1 * | 12/2004 | Nakamura | .................. | 710/310 |
| 6,882,624 B1 * | 4/2005 | Ma | .......................... | 370/236.1 |
| 6,901,081 B1 * | 5/2005 | Ludwig | ...................... | 370/519 |
| 6,925,060 B2 * | 8/2005 | Mangin | ...................... | 370/237 |
| 6,934,257 B2 * | 8/2005 | Liu et al. | .................... | 370/236 |
| 6,961,309 B2 * | 11/2005 | Carlson et al. | ............. | 370/235 |
| 6,990,070 B1 * | 1/2006 | Aweya et al. | ............... | 370/230 |
| 6,992,982 B1 | 1/2006 | Meryer et al. | | |
| 7,203,167 B2 * | 4/2007 | Meyer et al. | ................. | 370/231 |
| 2002/0054570 A1 * | 5/2002 | Takeda | ........................ | 370/252 |
| 2002/0150048 A1 * | 10/2002 | Ha et al. | ..................... | 370/231 |
| 2002/0167948 A1 * | 11/2002 | Chen | .......................... | 370/392 |
| 2005/0036511 A1 * | 2/2005 | Baratakke et al. | ........... | 370/469 |

(Continued)

FOREIGN PATENT DOCUMENTS

CN  1333965  1/2002

(Continued)

OTHER PUBLICATIONS

Chinese Office Action dated Nov. 3, 2006.

(Continued)

*Primary Examiner*—Ricky Ngo
*Assistant Examiner*—Dewanda Samuel
(74) *Attorney, Agent, or Firm*—Brinks Hofer Gilson & Lione

(57) ABSTRACT

A transmitter device which transmits a data block containing a unique number to a receiver device is caused to transmit subsequent segments to be transmitted after a transmitted segment up to a predetermined number in a case of receiving, after retransmitting the transmitted segment, an acknowledgement containing a number of the retransmitted data block.

18 Claims, 6 Drawing Sheets

FOREIGN PATENT DOCUMENTS

| | | |
|---|---|---|
| JP | 2001-298485 A | 10/2001 |
| JP | 2001-352339 A | 12/2001 |
| JP | 2003-224547 A | 8/2003 |
| WO | WO 00/41362 A1 | 7/2000 |
| WO | WO 02/082746 A1 | 10/2002 |

OTHER PUBLICATIONS

Stevens, R., "TCP Slow Start, Congestion Avoidance, Fast Retransmit, and Fast Recovery Algorithms", *Internet Engineering Task Force*, No. 1, Mar. 14, 1996, Total 6 Pages.

EPO Office Action mailed Aug. 17, 2006.

Ludwig, R., "Responding to Fast Timeouts in TCP" *draft-ludwig-tsvwg-tcp-fast-timeouts-00.txt*, Jul. 24, 2002, 2 pages.

Decision for Rejection issued Sep. 24, 2008 in Japanese application No. 2003-399988 (with English translation).

Miyake, et al., "A Study of Congestion Control Algorithm for High Speed TCP Communication on Wide Area Network", Information Processing Society of Japan Report, 98-DPS-88, vol. 98, No. 31, pp. 61-66, 1998 (ISSN 0919-6072) (with English abstract).

Japanese Office Action issued Dec. 18, 2007 in Japanese application No. 2003-399988. (with translation).

* cited by examiner

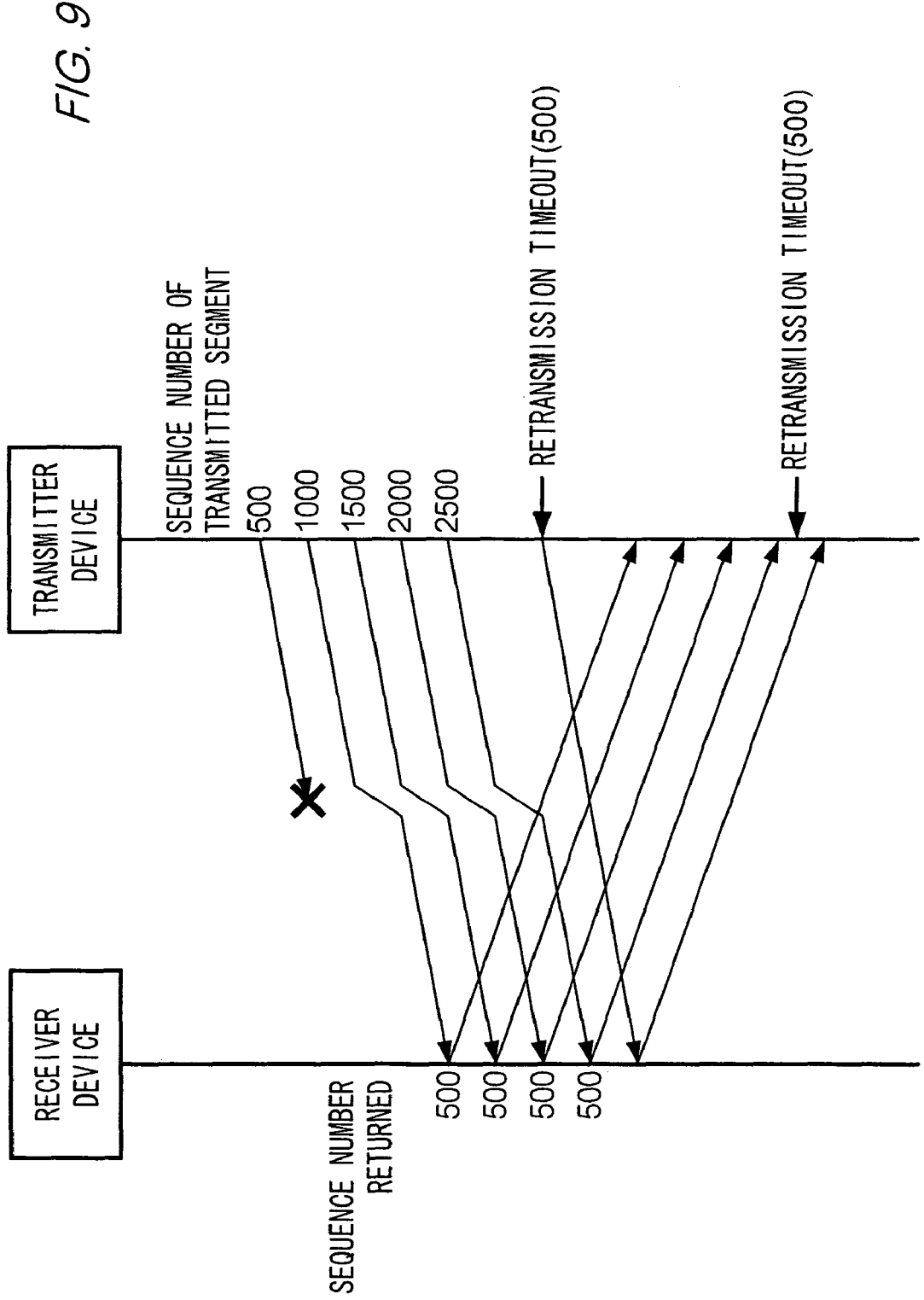

TRANSMITTER DEVICE FOR CONTROLLING DATA TRANSMISSION

RELATED APPLICATIONS

This Application claims priority under 35 U.S.C. §119 to Japanese Patent Application No. 2003-399988 filed Nov. 28, 2003, the entire content of which is hereby incorporated by reference.

BACKGROUND

1. Technical Field

This invention relates to a technique for maintaining efficient data communication in event of a retransmission timeout.

2. Background Information

TCP (Transmission Control Protocol) is a communication protocol widely used for data communication between a transmitter device and a receiver device. A transmitter device divides data for transmission to a receiver device into a plurality of portions, each portion of the data having a predetermined data size and being transmitted as a data block (hereinafter, a "segment"). Each segment contains each divided portion of the data and a unique header appended thereto, included in which header is a sequence number for uniquely identifying a divided portion of the data contained in each segment. Thus numbered segments are transmitted to a receiver device sequentially in ascending order. A receiver device, upon receiving a segment, returns a communication message (hereinafter, an "acknowledgement") for acknowledging the receipt of the segment. There is written in the acknowledgement a sequence number of a segment which a receiver device expects to receive next (hereinafter, an "acknowledgement number"). When a segment is safely received by a receiver device, an acknowledgement number should be larger than the sequence number of the segment received. Receiving such an acknowledgment at a transmitter device enables a determination to be made as to whether a transmitted segment has safely been received by a receiver device. A transmitter device transmits a subsequent segment to a receiver device only after receiving an acknowledgement for a transmitted segment.

A segment transmitted from a transmitter device, however, sometimes does not reach a receiver device before a retransmission timeout expires in a case that congestion occurs in a communication network used for data communication between the transmitter device and the receiver device. When no acknowledgement is received at a transmitter device within a predetermined time period since the time when a segment was transmitted, the transmitter device regards a segment as being lost (i.e., "segment loss"). The transmitter device then performs a retransmission of the apparently lost segment. Reliability of communication is thus ensured when communication is performed according to TCP.

However, at the expense of ensuring reliability, data transmission efficiency is caused to deteriorate. To attain a balance between the reliability and efficiency of data transmission, TCP prescribes that segments can be transmitted from a transmitter device in succession up to a certain number without an acknowledgement from a receiver device being received; and the number of segments that can be transmitted is incremented each time an acknowledgement is received for a transmitted segment. Such a segment transmission method is called "window control", and the number of segments transmitted in succession a "congestion window size."

When a retransmission timeout occurs where such window control is being performed, a transmission device retransmits an oldest segment (i.e., a segment having the smallest sequence number) from among transmitted segments that have not been acknowledged and reduces the congestion window size to a minimum value (for example, a value in bytes corresponding to one segment), which would otherwise cause an influx of a large number of segments to an already congested network state. After the congestion window size is once reduced, a transmitter device again increases the congestion window size according to a predetermined algorithm each time it receives an acknowledgement for a transmitted segment.

Two types of algorithms, a Slow Start algorithm and a Congestion Avoidance algorithm, are used when the congestion window size is increased by a transmitter device according to TCP. The Slow Start algorithm exponentially increases a congestion window size, and the Congestion Avoidance algorithm linearly increments the congestion window size. A transmitter device which transmits a segment based on TCP generally performs the Slow Start algorithm until the congestion window size reaches a predetermined threshold, and performs the Congestion Avoidance algorithm after the congestion window size reaches the threshold. Congestion is thus avoided in data communication based on TCP.

A transmitter device which transmits a segment according to TCP retransmits a segment, being triggered not only by a retransmission timeout occurring but also by a receipt of more than one, for example three, acknowledgments (hereinafter, duplicate ACKs) having the same acknowledgement number. The segment retransmission triggered by duplicate ACKs is performed without waiting for the expiration of the retransmission timeout, and therefore, is called a "Fast Retransmit" algorithm. When the Fast Retransmit algorithm is performed, the congestion window size is reduced to a predetermined size, for example, one-half of the current window size at the time of the Fast Retransmit, and the thus once reduced congestion window size is increased again each time an acknowledgment is received for a transmitted segment according to the Congestion Avoidance algorithm. This is called "Fast Recovery" since the congestion window size is increased using the Congestion Avoidance algorithm without performing the Slow Start algorithm beforehand. A transmitter device thus retransmits a segment, being triggered either by a retransmission timeout occurring or a receipt of duplicate ACKs, according to TCP.

However, a retransmission timeout and a receipt of duplicate ACKs occur independently from each other; for example, after a segment is retransmitted according to the Fast Retransmit algorithm, a retransmission timeout may take place due to timeout expiration when waiting for an acknowledgement from a receiver device for the segment just retransmitted according to the Fast Retransmit algorithm. In such a case, the congestion window size is reduced to a predetermined value at the time of retransmission according to the Fast Retransmit algorithm, and is then again reduced to a minimum value at the time of a subsequent retransmission timeout. As a result, data transmission efficiency is significantly deteriorated.

A technique for such a problem has been proposed in Laid-Open Publication Japanese Patent Application, JP 2001-352339 and in "Responding to Fast Timeouts in TCP" (Reiner Ludwig, IETF, Jul. 24, 2002).

JP 2001-352339 proposes a technique for restoring the congestion window size when it is determined by a transmitter device that the retransmission timeout was invalid, where the congestion window size was reduced to a minimum value at an event of a latest retransmission timeout. Specifically, a receiver device is caused to report to a transmitter device an event where identical segments are received in duplicate. In a case where the transmitter device receives such a report, the transmitter device increases the congestion window size to a predetermined value. In a conventional method, the two identical segments, an originally transmitted segment and a retransmitted segment, are transmitted to a receiver device in a case where the retransmission of a segment is performed as a result of a retransmission timeout occurring. If each of the two segments is safely received by the receiver, retransmission of a segment triggered by a timeout will have been unnecessary, and thus a reduction in the congestion window size triggered by the retransmission timeout will also have been unnecessary. The technique proposed in JP 2001-352339 enables a transmitter device to restore this once decreased congestion window size, thereby to avoid any unwanted, unnecessary decrease in congestion window size.

According to the technique proposed by Ludwig, a transmitter device is caused to perform the Fast Recovery algorithm in a case where one or two duplicated acknowledgement(s) is/are received from a receiver device before the expiration of a retransmission timeout and one or more duplicated acknowledgement is further received after the retransmission timeout expires.

Even if the algorithm proposed in JP 2001-352339 is applied, however, a second retransmission timeout might occur before a transmitter device receives a report from a receiver device notifying the transmitter device of receipt of two identical segments. In more detail, in a case where a large number of segments (hereinafter, original segments) are transmitted from a transmitter device before an acknowledgement is received, according to a current congestion window size, and one of the original segments is retransmitted as a result of a first retransmission timeout, the retransmitted segment will be received by a receiver device after the original segments are received by the receiver device. As a result, a second retransmission timeout may expire before receiving a report from the receiver device, i.e., before determining the first timeout was valid. FIG. 9 is an example of such a case where five segments having sequence numbers of 500, 1000, 1500, 2000, and 2500 are transmitted from a transmitter device and a retransmission timeout expires for the first segment having the sequence number 500, resulting in a retransmission of the first segment (500). As shown in the figure, the retransmitted segment (500) reaches the receiver device after the four segments having the sequence numbers of 1000 to 2500 are received by the receiver device. A second retransmission timeout for the retransmitted segment (500) is then likely to occur before the transmitter device receives a report from the receiver device that two identical segments (500) have been received.

Also, the technique proposed by Ludwig only serves a very limited situation where one or two acknowledgements are received before a retransmission timeout expires and one or more acknowledgement is received after the retransmission timeout occurring.

BRIEF SUMMARY

The present invention has been envisioned in view of the situation described above, and its object is to enhance data transmission efficiency without aggravating network congestion in a case where congestion is inferred as being insignificant. FIG. 9 shows an example of insignificant congestion. In the example, after a segment is retransmitted from a transmitter device to a receiver device, an acknowledgement having a sequence number of the retransmitted segment is received. Such an acknowledgment would not be received if a network connecting a transmitter device and receiver device is subject to severe congestion and a large number of segments have been lost. In other words, the communication network is in a congestion state, but the degree of the congestion is relatively insignificant.

In one aspect, the present invention provides a transmitter device comprising first transmission means for transmitting to a receiver device, through a communication network, data blocks in succession up to a predetermined amount, after writing sequence information to each of the data blocks, the sequence information showing an order of the data blocks; receiving means for receiving from the receiver device an acknowledgement that acknowledges receipt of one or more of the data blocks, the acknowledgement containing sequence information of a data block to be received next by the receiver device; first retransmission means for retransmitting one of the data blocks for which the acknowledgment has not been received by the receiving means, before a retransmission timeout expires; and second transmission means for transmitting subsequent data blocks waiting for transmission following the data blocks transmitted by the first transmission means in a case where, after the retransmission of the data block is performed by the first retransmission means, an acknowledgement containing sequence information of the retransmitted data block is received by the receiving means, where a number of the subsequent data blocks transmitted by the second transmission means is limited to a predetermined number.

In another aspect, the present invention provides a transmitter device comprising: transmission means for transmitting to a receiver device, through a communication network, data blocks in succession up to an amount defined by a congestion window size, after writing sequence information to each of the data blocks, the sequence information showing an order of the data blocks; receiving means for receiving from the receiver device an acknowledgement that acknowledges receipt of one or more of the data blocks, the acknowledgement containing sequence information of a data block to be received next by the receiver device; first retransmission means for retransmitting one of the data blocks for which the acknowledgment has not been received, before a retransmission timeout expires, by the receiving means; and reducing means for reducing the congestion window size to a predetermined value in a case where the retransmission of the data block is performed by the first retransmission means; and control means for increasing the congestion window size according to a predetermined algorithm and for transmitting subsequent data blocks waiting for transmission following the data blocks transmitted by the transmission means in a case where, after the retransmission of the data block is performed by the first retransmission means, an acknowledgement containing sequence information of the retransmitted data block is received by the receiving means.

In still another aspect, the present invention provides a transmitter device comprising storage means; transmission means for transmitting to a receiver device, through a communication network, data blocks in succession up to an amount defined by a congestion window size, after writing sequence information to each of the data blocks, the sequence information showing an order of data blocks; receiving means for receiving from the receiver device an acknowledgement that acknowledges receipt of one or more of the data blocks, the acknowledgement containing sequence information of a data block to be received next by the receiver device; first retransmission means for, in a case where an acknowledgement containing the same sequence information is received a predetermined number of times, the sequence information identifying one of the data blocks transmitted by the transmission means, retransmitting a data block that has the sequence information; time keeping means for starting measuring time at a time when the retransmission of the data block is performed by the first retransmission means; second retransmission means for retransmitting the data block retransmitted by the retransmission means in a case where no acknowledgement that acknowledges receipt of the data block retransmitted by the first retransmission means is received by the receiving means before the time measured by the time keeping means reaches a predetermined time; reducing means for reducing the congestion window size after storing the congestion window size in the storage means at a time when the retransmission of the data block is performed by the second retransmission means; and control means for increasing the congestion window size according to a predetermined algorithm with a value determined based on the congestion window size stored in the storage means as an initial value, and for transmitting subsequent data blocks waiting for transmission following the data blocks transmitted by the transmission means in a case where, after the data block is retransmitted by the second retransmission means, an acknowledgement containing the sequence information of the retransmitted data block by the second retransmission means is received by the receiving means.

The present invention further provides a program product for causing a computer device to execute functions performed by means provided in each of the above transmitter devices, as well as a recording medium which stores such a program product. The present invention also provides a method of controlling data transmission which comprises steps performed by each of the transmitter devices.

The present invention enhances data transmission efficiency without further deteriorating network congestion in a case where congestion is inferred as being insignificant.

BRIEF DESCRIPTION OF THE DRAWINGS

FIG. 9 is a diagram showing an example of a communication sequence between a transmitter device and a receiver device.

DETAILED DESCRIPTION OF PREFERRED EMBODIMENTS

In the following, description will be given of preferred embodiments of the present invention with reference to the attached drawings.

A: First Embodiment

A-1: Configuration

Figure 1:
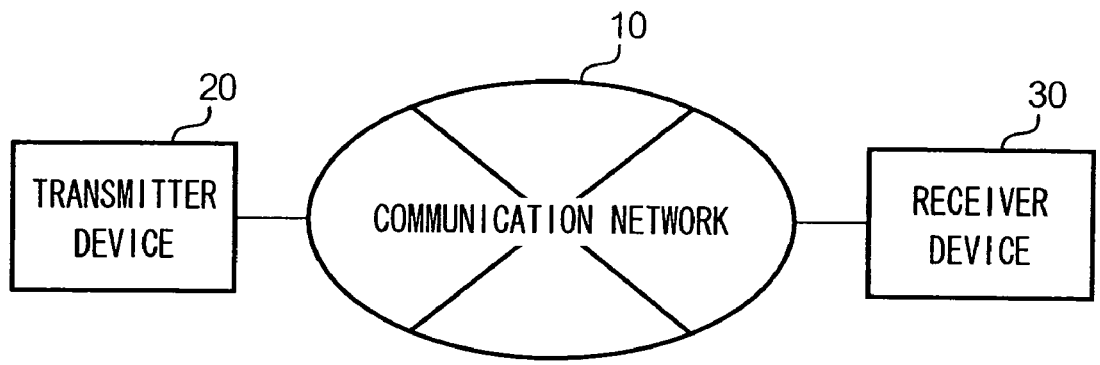
FIG. 1 is a diagram showing an example of a configuration of a communication system comprising a transmitter device 20 according to a first embodiment of the present invention.

FIG. 1 is a diagram showing an example of an overall configuration of a communication system of a first embodiment according to the present invention. The communication system comprises a transmitter device 20 connected to a communication network 10, and a receiver device 30. Communication network 10 is for example the Internet and comprises a relay device such as a router, a gateway, and the like. Communication network 10 relays data exchanged according to a predetermined communication protocol (TCP in the present embodiment). In the present embodiment, description will be given of a case where communication network 10 is the Internet, but a communication network may be a LAN (Local Area Network), a mobile packet communication network, a wireless communication network such as a wireless LAN, or any other type of communication network if it is capable of relaying data between transmitter device 20 and receiver device 30 according to a predetermined communication protocol. Also in the present embodiment, description will be given of an example where TCP is followed when communication is performed through communication network 10 between transmitter device 20 and receiver device 30. A communication protocol in the meaning of the present invention is not limited to TCP but can also be any communication protocol if the protocol prescribes that sequence information such as a sequence number is used to confirm whether a transmitted data block has reached its destination, and that a transmitted data block is retransmitted in a case where confirmation is not made before a predetermined retransmission timeout expires.

Transmitter device 20 and receiver device 30 are personal computers (hereinafter, PCs) connected to communication network 10 and are capable of performing communication through communication network 10 according to TCP. While description will be given in the present embodiment of a case where transmitter device 20 and receiver device 30 are PCs performing communication according to TCP, transmitter device 20 and/or receiver device 30 may be a PDA (Personal Digital Assistance), a mobile phone performing communication according to TCP, or any other computer device if it is capable of performing communication according to a predetermined communication protocol.

The communication system shown in FIG. 1 differs from a conventional communication system performing communication according to TCP. In the communication system shown in FIG. 1, a segment that should follow after already transmitted segments (hereinafter, a subsequent segment) is transmitted in a case where transmitter device 20, after retransmitting a segment due to a retransmission timeout, receives an acknowledgement containing a sequence number of the retransmitted segment as an acknowledgement number. A subsequent segment is transmitted until a number of subsequent segments transmitted reaches a predetermined number of segments (hereinafter, a transmission upper limit, and determined as "2" segments in the present embodiment), each time transmitter device 20 receives an acknowledgement containing the sequence number of the retransmitted segment.

Description will now be given of a configuration of transmitter device 20 with reference to FIG. 2. As shown in the figure, transmitter device 20 comprises a control unit 100, a communication interface (hereinafter, IF) unit 110, a storage unit 120, and a bus 130 for relaying data exchanged between the above units.

Control unit 100 is, for example, a CPU (Central Processing Unit), and controls other units of transmitter device 20 by reading and executing software stored in storage unit 120. Communication IF unit 110 is connected to communication network 10; it receives a segment transmitted through communication network 10, passes the received segment to control unit 100, and transmits the segment passed from control unit 100 to communication network 10.

Figure 2:
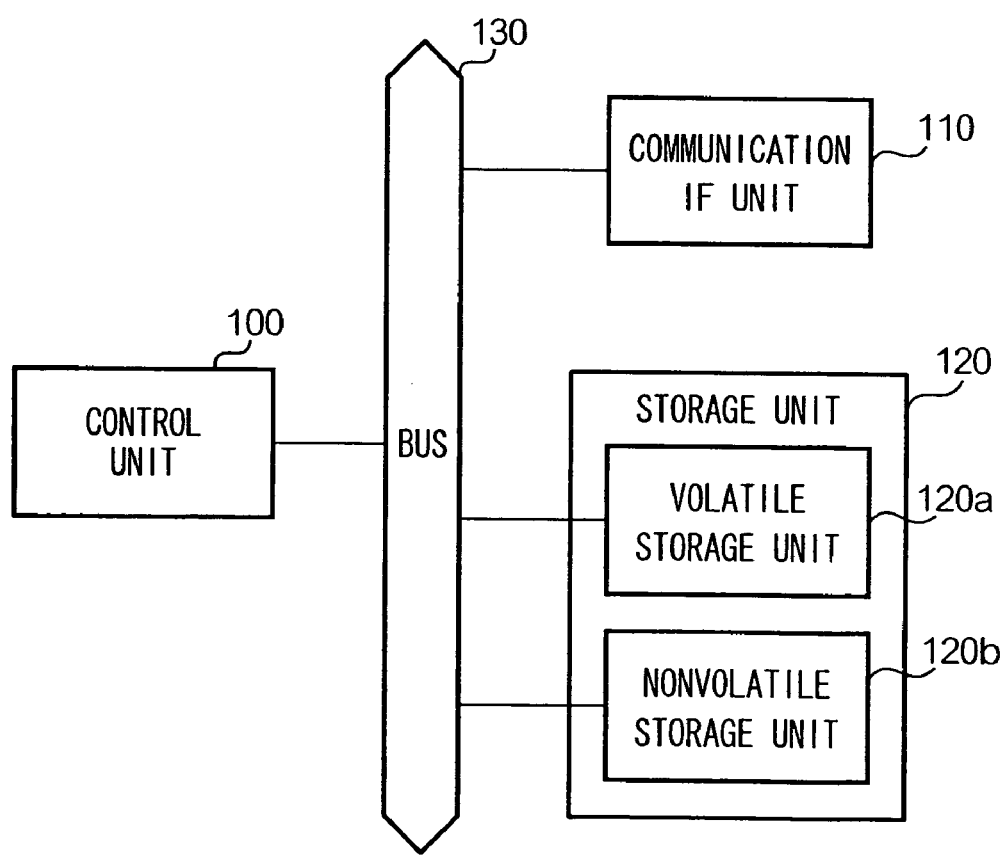
FIG. 2 is a diagram showing an example of a hardware configuration of transmitter device 20.

Storage unit 120, as shown in FIG. 2, has a volatile memory 120*a* and a nonvolatile memory 120*b*. Volatile memory 120*a* is, for example, a RAM (Random Access Memory) and is used as a work area by control unit 100 which operates according to software. Volatile memory 120*a* stores data showing a number of subsequent segments transmitted to receiver device 30 (hereinafter, transmission counter). Nonvolatile memory 120*b* is, for example, a hard disk, and at least stores each of transmission data for transmission to receiver device 30, data showing an initial value of a congestion window size, data showing a retransmission timeout value, and data showing a transmission upper limit. In the present embodiment, the transmission data is stored in nonvolatile memory 120*b*, but it is also possible for a user to input such data by using an input unit (not shown) such as a keyboard or a mouse. Similarly, data showing a retransmission timeout value is stored in nonvolatile memory 120*b* in the present embodiment, but it is also possible to cause control unit 100 to perform, for example, "PING" (Packet Internet Groper) prior to segment transmission, thereby to obtain a retransmission timeout value based on a time required for responding to "PING."

There is further stored in nonvolatile memory 120*b* OS (operating system) software for causing control unit 100 to operate, and data transmission software for transmitting data to receiver device 30 according to TCP.

Control unit 100 provides the following functions upon execution of the software stored in nonvolatile memory 120*b*.

When transmitter device 20 is turned on, control unit 100 first reads and executes OS software from nonvolatile memory 120*b*. Control unit 100 which is run under the OS software functions to control each unit of transmitter device 20 and a function of reading and executing other software from nonvolatile memory 120*b*. When the OS software is executed and run, control unit 100, upon receiving a request from a receiver device 30 for transmission of the data stored in the memory 120*b*, reads and executes the data transmission software from nonvolatile memory 120*b*.

Control unit 100 operating according to the data transmission software provides the following four functions, which are also provided in a conventional transmitter device for transmitting a segment according to TCP. The first function is a segment transmission function of generating segments by dividing data to be transmitted to receiver device 30 into portions with a predetermined data size, and transmitting a number of segments defined by the congestion window size in an ascending order of a sequence number assigned to each segment. The second function is a time keeping function of starting a measuring time, triggered by transmission of a segment by the segment transmission function. The third function is a receiving function of receiving an acknowledgement transmitted from receiver device 30. There is written in the acknowledgement a sequence number of a segment which receiver device 30 should receive next. The fourth function is a retransmission function of retransmitting one of the segments that have already been transmitted by the segment transmission function, for which an acknowledgement has not been received by the receiving function before the time measured by the time keeping function reaches a retransmission timeout value.

Control unit 100 when operating according to the data transmission software additionally provides a function particular to the present invention. That is, a subsequent segment transmission function of transmitting a number of segments according the transmission upper limit in a case where transmitter device 20, after retransmitting a segment by the retransmission function, receives by the receiving function an acknowledgement containing a sequence number of the retransmitted segment.

As in the foregoing, a hardware configuration of transmitter device 20 is the same as that of a general computer device, but transmitter device 20 is provided with a function particular to the present invention as well as functions that are common in a conventional transmitted device which transmits segments according to TCP, by having control unit 100 to execute the software stored in storage unit 120.

While in the present embodiment the above functions are realized using software modules, it is also possible to configure the transmitter device 20 using hardware modules having the same functions as those provided in the software modules.

A-2: Operation

Figure 3:
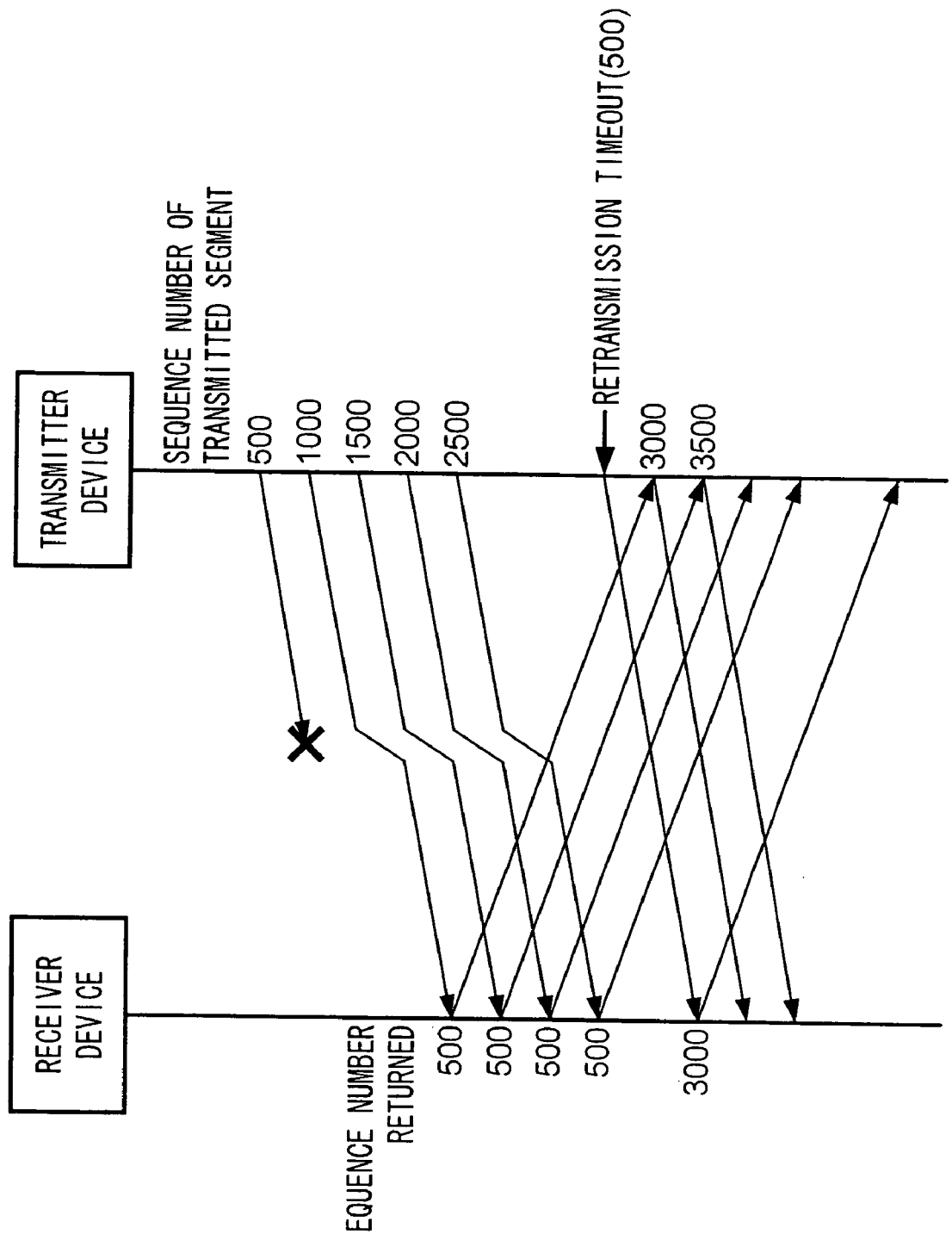
FIG. 3 is a diagram showing an example of a communication sequence between transmitter device 20 and a receiver device 30.

Description will now be given, with reference to the drawings, of an operation performed by transmitter device 20 of the first embodiment, with a particular focus on the operation showing characteristics of transmitter device 20. In the following example of the operation, control unit 100 of transmitter device 20 operates according to the above data transmission software, and has already transmitted a total of five segments having sequence numbers 500, 1000, 1500, 2000, and 2500 to receiver device 30 as shown in FIG. 3. It is assumed here that a segment having the sequence number 500 has been lost, and a retransmission timeout has expired as a result. In the situation given above, control unit 100 performs an operation, as shown in FIG. 4, in a case where it receives an acknowledgement containing a sequence number of the segment retransmitted due to the retransmission timeout.

Description will be omitted of an operation performed by control unit 100 up to a step of retransmitting a segment, since the operation is identical to that performed by a conventional transmitter device which transmits a segment according to TCP.

In this example, the transmission counter is set "0" when the operation described in the following is started; that is, the transmission counter is initialized at an event of a retransmission timeout.

Figure 4:
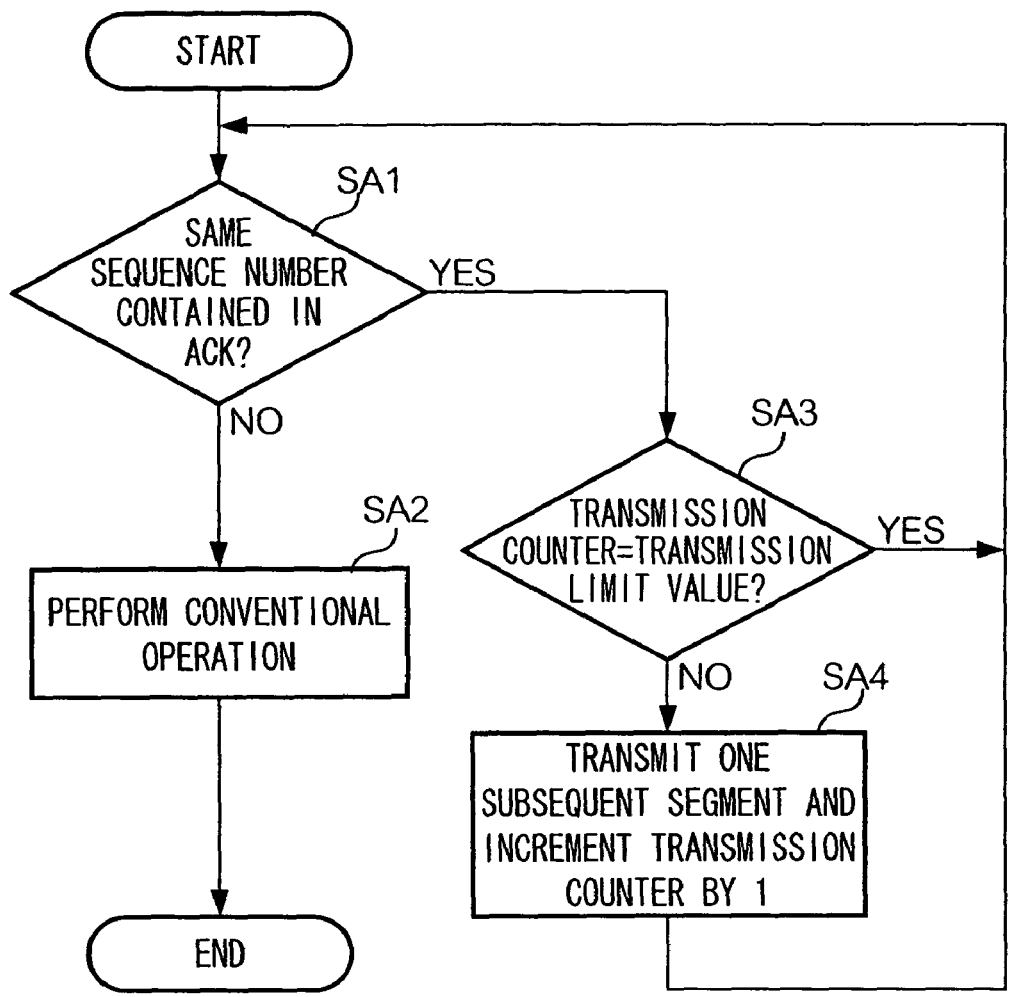
FIG. 4 is a flowchart showing a flow of a data transmission operation performed by a control unit 100 of transmitter device 20.

As shown in FIG. 4, control unit 100 first determines whether an acknowledgement received through communication IF unit 110 contains a sequence number that is the same as that of a segment retransmitted due to the retransmission timeout occurring (Step SA1). In a case where the determination of Step SA1 results in "No", control unit 100 performs an operation that is the same as a conventional transmitter device performs (Step SA2). Specifically, control unit 100 increments the congestion window size according to a predetermined algorithm (e.g., the Slow Start algorithm), and transmits subsequent segments corresponding to the number defined by the updated congestion window size.

In a case where the determination of Step SA1 is "Yes," control unit 100 performs the process on and after Step SA3. In the example of operation shown in FIG. 3, the sequence number of a segment retransmitted due to the retransmission timeout is "500"; and a sequence number contained in an acknowledgement transmitted from receiver device 30 after the retransmission timeout occurring is "500". It is therefore determined "Yes" in Step SA1, and as a result, the process of Step SA3 and the following processes are performed.

In Step SA3, control unit 100 determines whether a number of subsequent segments that have been transmitted reach the transmission upper limit. Specifically, control unit 100 compares the value set as the transmission upper limit stored in nonvolatile memory 120*b* with the value of the transmission counter stored in volatile memory 120*a*. It is determined that subsequent segments of the number defined by the transmission upper limit have already been transmitted in the case that the values of the transmission upper limit and the transmission counter are the same (Step SA3; Yes). In this case, control unit 100 repeats the process on and after Step SA1. In a case where it is determined "No" in Step SA3, control unit 100 transmits one subsequent segment, and increments a value of the transmission counter by one (Step SA4), and repeats the process on and after Step SA1.

In the present example of operation, the transmission counter is set to "0" at the start of operation, and the value of the upper limit is "2"; therefore, control unit 100 performs the process of Step SA4 for the first two acknowledgements containing the sequence number of "500" transmitted after the retransmission timeout occurs. That is, as shown in FIG. 3, two subsequent segments (a segment having the sequence number "3000" and a segment having the sequence number "3500") are transmitted to receiver device 30.

A-3: Effects of the First Embodiment

As in the foregoing, data transmission efficiency is enhanced according to the first embodiment, since subsequent segments are transmitted in a case where congestion is estimated as being insignificant, i.e., in the case of receiving an acknowledgement containing a sequence number that is the same as that of a retransmitted segment due to a retransmission timeout. Further, since the number of subsequent segments is limited to a predetermined number, network congestion in communication network 10 will not deteriorate any further.

Retransmission of a segment may be triggered not only by retransmission timeout but also by the First Retransmit algorithm where duplicate ACKs are received at a transmitter device. Thus, the transmission of subsequent segments according to the present embodiment may be performed in a case where an acknowledgement is received after a segment is retransmitted according to the First Retransmit algorithm, the acknowledgement containing the same sequence number as that of the retransmitted segment.

B: Second Embodiment

B-1: Configuration

Figure 5:
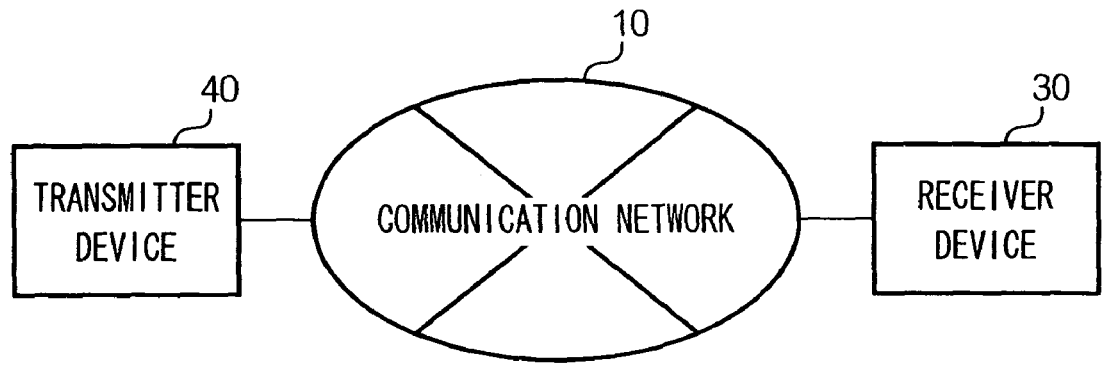
FIG. 5 is a diagram showing an example of a configuration of a communication system comprising a transmitter device 40 according to a second embodiment of the present invention.

Description will be now given of a second embodiment of the present invention with reference to the drawings. FIG. 5 is a diagram showing an example of an entire configuration of a communication system having a transmitter device of the second embodiment. A communication system shown in FIG. 5 differs from the communication system of FIG. 1 in that a transmitter device 40 is provided instead of transmitter device 20. Description will be given in the following with particular focus on transmitter device 40.

A hardware configuration of transmitter device 40 is the same as that of transmitter device 20 shown in FIG. 2, but data transmission software stored in a nonvolatile memory 120*b* of transmitter device 40 is different from that stored in transmitter device 20. Thus, control unit 100 of transmitter device 40 is provided with a function which is different to that provided to control unit 100 of transmitter device 20. Specifically, a window size reducing function and a control function are provided to control unit 100 of transmitter device 40 in addition to the segment transmission function, time keeping function, receiving function, and segment retransmission function described above.

By the window size reducing function, a current congestion window size is written and stored in volatile memory 120*a* as a preserved window size at the time of retransmitting a segment by the segment retransmission function due to a retransmission timeout occurring, and the congestion window size is reduced to a predetermined value (for example, a minimum value of the congestion window size).

By the control function, after a segment is retransmitted by the segment retransmission function, the congestion window size is incremented according to a predetermined algorithm with the preserved congestion window size as an initial value, each time an acknowledgement having a sequence number that is the same as that of the retransmitted segment is received by the receiving function. An example of such a predetermined algorithm is the Congestion Avoidance algorithm.

In the second embodiment, functions particular to the present invention are realized at a transmitter device using software modules, but it is also possible to configure transmitter device 40 using hardware modules which have the same functions as provided in the software modules.

B-2: Operation

Description will now be given of an operation performed by transmitter device 40 of the second embodiment, especially of an operation for describing distinctive features of the present embodiment. In the example operation described in the following, the same situations have been given as that of the first embodiment, as shown in FIG. 3. In this example, five segments having sequence numbers of 500, 1000, 1500, 2000, and 2500 are transmitted from transmitter device 40 to receiver device 30, and a segment having the sequence number of 500 is lost, resulting in a retransmission timeout. In the following, description will be given, with reference to FIG. 6, of an operation performed by control unit 100 upon receiving an acknowledgement having the same sequence number as that of the retransmitted segment after the retransmission timeout occurring.

Figure 6:
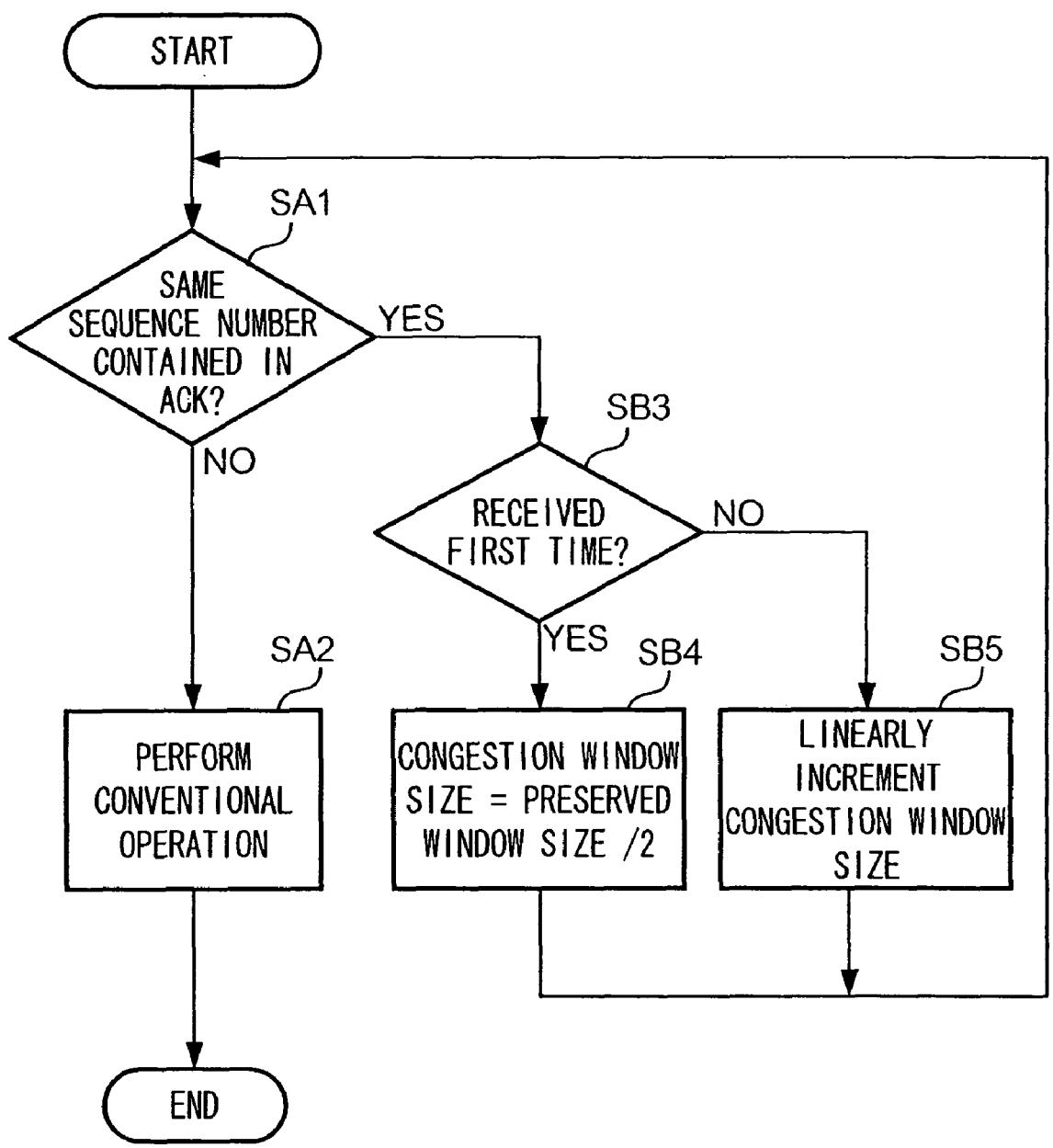
FIG. 6 is a flowchart showing a flow of a congestion window size control operation performed by a control unit 100 of transmitter device 40.

FIG. 6 is a flowchart showing an operation performed by control unit 100 of transmitter device 40 in the case of receiving, after retransmitting a segment due to a retransmission timeout occurring, an acknowledgement having the same sequence number as that of the retransmitted segment. The flowchart shown in FIG. 6 differs from that shown in FIG. 3 in that the processes of Steps SA3 and SA4 are replaced with the Steps of SB3 to SB5. In the following, the processes of Steps SB3 to SB5 will be described with particular emphasis thereon.

The process of Step SB3 is performed when it is determined "Yes" in Step SA1, which is a case where an acknowledgement received from receiver device 30 contains a sequence number that is the same as that of the retransmitted segment. In Step SB3, control unit 100 of transmitter device 40 determines whether it is the first time that an acknowledgement is received after the retransmission timeout. Control unit 100, when it is determined "Yes" in Step SB3, increments the value of the congestion window size to one-half of the preserved window size stored in the volatile memory 120*a* (Step SB4). When it is determined "No" in Step SB3 to the contrary, the congestion window size is incremented according to the Congestion Avoidance algorithm (Step SB5).

Figure 7:
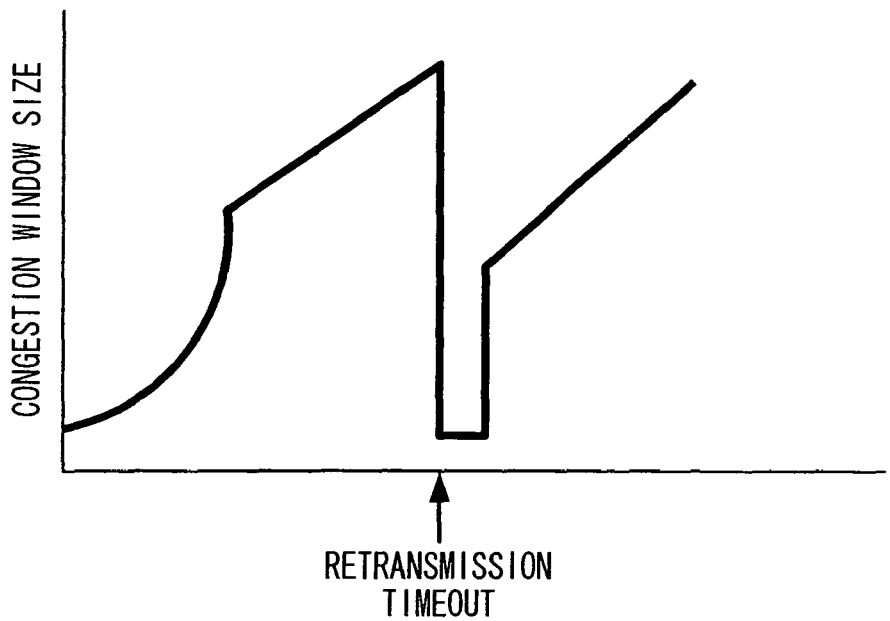
FIG. 7 is a diagram for describing a change in a congestion window size of transmitter device 40.

According to present embodiment, control unit 100 of transmitter device 40 performs the Fast Recovery algorithm as shown in FIG. 7, each time it receives an acknowledgement having the same sequence number as that of a retransmitted segment after the segment is retransmitted due to a retransmission timeout.

In the present embodiment, the increase in the congestion window size according to the Fast Recovery algorithm is started upon receipt of the first acknowledgment, but it is also possible to start the increase according to the Fast Recovery algorithm after a predetermined number of acknowledgements (e.g., three acknowledgments) is received, having the same sequence number as that of the retransmitted segment. In this way, subsequent segments may be transmitted according to the operation described in the first embodiment where the number of acknowledgments received is less than three, and the congestion window size is increased according to the operation described in the present second embodiment thereafter. Accordingly, data transmission efficiency is further enhanced by thus combining the first and the second embodiments.

In the second embodiment, the Fast Recovery algorithm is started with an initial value of one-half of the congestion window size as of the retransmission timeout occurring. However, the initial value of the congestion window size is not limited to one-half, but may be one-third or three-fourths of the congestion window size, or any other value that can be obtained based on the congestion window size as of the retransmission timeout.

Further, the Slow Start algorithm and then the Congestion Avoidance algorithm may be performed instead of performing the Fast Recovery algorithm upon receiving an acknowledgment having a sequence number that is the same as that of the retransmitted segment. In this case, the Slow Start algorithm is started from the congestion window size in its minimum value, and therefore, the preserved window size need not be stored in the volatile memory 120*a*.

B-3: Effects of Second Embodiment

As in the foregoing, in the second embodiment, the Fast Recovery algorithm is performed in a case where a transmitter device 40 receives, after retransmitting a segment due to a retransmission timeout, an acknowledgement containing a sequence number of the retransmitted segment. In a conventional communication system, such an acknowledgement after a retransmission timeout is simply discarded and the congestion window size is not increased. Even when the congestion window size is increased as in Ludwig, particular conditions need to be satisfied. In comparison, according to the second embodiment, the Fast Recovery algorithm is performed each time an acknowledgement is received, so that the congestion window size is increased. Thus, data transmission efficiency is enhanced while avoiding deterioration of the existing congestion state in communication network 10.

The Fast Recovery according to the present embodiment may be triggered not only by a retransmission timeout but also by a First Retransmit algorithm performed upon a receipt of duplicate ACKs. Thus, the Fast Recovery algorithm may be performed in a case where an acknowledgement is received after a segment is retransmitted according to the First Retransmit algorithm, where the acknowledgement contains the same sequence number as that of the retransmitted segment.

C: Modification

The following modifications may be envisioned for preferred embodiments of the present invention described in the foregoing.

C-1: Modification 1

In the first embodiment, a transmitter device is caused to transmit subsequent segments one by one up to a predetermined number each time the device receives, after retransmitting a segment due to a retransmission timeout, an acknowledgement containing a sequence number of the retransmitted segment, but it is also possible to send more than one segments at one time until the number of subsequent segments transmitted reaches the predetermined number. Any number of subsequent segments may be transmitted at one time if the number of segments is limited to a predetermined number until a segment pertaining to retransmission is acknowledged.

C-2: Modification 2

In the second embodiment, in a case where a retransmission timeout occurs during the Fast Recovery algorithm is being performed after a segment is retransmitted according to the Fast Retransmit algorithm, and then an acknowledgment containing the retransmitted segment is received, the congestion window size may be increased initially to a value as of the retransmission timeout occurring and then increased according to the Fast Recovery algorithm.

Figure 8:
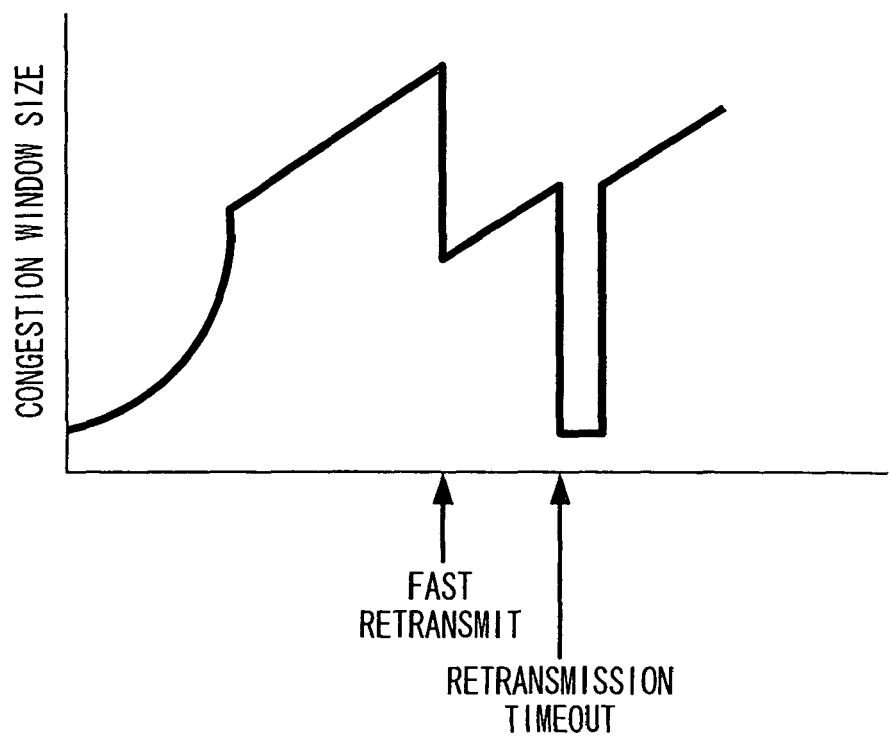
FIG. 8 is a diagram for describing a change in a congestion window size of a transmitter device according to a modification 2.

Specifically, a transmitter device is caused to store the congestion window size as of the retransmission timeout occurring as a preserved window size. In a case where the transmitter device receives an acknowledgement containing a sequence number of a segment pertaining to the retransmission, the congestion window size is initialized to the value of the preserved window size and then the Fast Recovery is performed for a second time. In this way, the Fast Recovery can be continued as if no retransmission timeout had taken place, even if a retransmission timeout occurs during the Fast Recovery, as shown in FIG. 8.

In the present modification, the congestion window size is increased to a value as of the retransmission timeout occurring, but it is also possible to increase the congestion window to twice or even one-half of the value as of the retransmission timeout, or any other value that can be determined based on the congestion window size as of the retransmission timeout or as of immediately before the second Fast Retransmit.

C-3: Modification 3

In a communication performed according to TCP, duplicate ACKs are possibly transmitted from a receiver device in a case other than segment loss. For example, a segment is duplicated or fragmented in a communication network, and as a result, more than one segments having the same sequence number reaches a receiver device, leading to reception at a transmitter device of more than one acknowledgments having the same sequence number. If the determination is made at a transmitter device as to whether a congestion state in a communication network is insignificant based on duplicate ACKs including such an acknowledgement transmitted based not on a segment loss, the network congestion state may not be properly ascertained. To avoid a defective determination being made, a receiver device can be caused to determine whether a received segment has-been duplicated or fragmented during transmission in the communication network, on the basis of information contained in the segment (e.g., data written in an "IP Options" field), and then to transmit an acknowledgement to a transmitter device after adding thereto appendix data showing the result of the determination. A transmitter device is caused to discard a received acknowledgement in a case where the appendix data is contained in the acknowledgement. In this way, it is possible to avoid a detrimental effect caused by segment duplication or fragmentation.

C-4: Modification 4

In the first embodiment, subsequent segments are transmitted up to a predetermined number in a case where an acknowledgement is received after a segment is retransmitted due to a retransmission timeout, where the acknowledgment contains a sequence number of the retransmitted segment, while in the second embodiment, the congestion window size is increased according to a predetermined algorithm so as to effect transmission of subsequent segments.

However, a retransmitted segment does not always reach a receiver device since the retransmitted segment can also be subject to segment loss. To cope with such a situation, further retransmission of a segment based on a retransmission timeout for the retransmitted segment may be performed. Specifically, a time keeping means may be provided which starts measuring time at a time when a segment is retransmitted due to the retransmission timeout; and the segment may be retransmitted again if no acknowledgement containing a sequence number that is larger than the retransmitted segment is received before the time measured by the time keeping means exceeds a predetermined time period. In this way, a segment is retransmitted for a second time even if a segment pertaining to a retransmission is lost.

Alternatively, a retransmitted segment may be further retransmitted in a case where the number of duplicate ACKs containing the sequence number of the retransmitted segment exceeds a predetermined number after the segment is retransmitted due to a retransmission timeout and during subsequent segments are being transmitted. The predetermined number may be, for example, a value computed based on a number of subsequent segments transmitted after the retransmitted segment, since receipt of duplicate ACKs exceeding the predetermined number means that a segment pertaining to the retransmission has not yet been received by a receiver device, but the subsequent segments transmitted after the retransmitted segment have been received. Given that segments transmitted from a transmitter device are likely to reach a receiver device in the order transmitted, it can then be inferred that the retransmitted segment has been lost. Thus, loss of a retransmitted segment can be detected upon receipt of duplicate ACKs exceeding a predetermined number, thereby to enable retransmission of the retransmitted segment without waiting for a retransmission timeout for the retransmitted segment.

It is also possible to use a known technique such as SACK (Selective ACKnowledgement) option or a Timestamp option for detecting whether subsequent segments have been received while a retransmitted segment has not been received by a receiver device, thereby to retransmit the retransmitted segment. In the case of using the Timestamp option, a timestamp showing a transmission time is written in a segment upon transmission from a transmitter device, and a receiver device is caused to return an acknowledgement with the received timestamp being copied and written therein. In a case that a segment is retransmitted, a retransmission time is stored at a transmitter device, and in a case of receiving an acknowledgement having a Timestamp which shows a later time than the stored retransmission time, the retransmitted segment is once again transmitted, thus enabling effective retransmission of a retransmitted segment in a case where the retransmitted segment is lost.

Among the above-described SACK option, Timestamp option, or the number of subsequent segments transmitted used as a predetermined number, the number of subsequent segments transmitted as a predetermined number is the most preferable as a basis for determining whether to retransmit a retransmitted segment. Namely, while the same effect can be obtained by use of any one of the three different options for making a determination, use of the number of subsequent segments, as described, is preferable since no additional function needs to be provided in a receiver device. In contrast, use of either the SACK option or Timestamp necessitates that a receiver device be provided with an extra function such that it can add a SACK option or a Timestamp to an acknowledgement.

C-5: Modification 5

In the first and second embodiments, transmission data to be transmitted to a receiver device is divided into portions each having a predetermined data size to generate segments, and thus generated segments are transmitted. A data unit transmitted from a transmitter device to a receiver device, however, is not limited to a segment but may be a packet, frame, or any other unit if a data block contains a portion of divided data and a sequence number for uniquely identifying the divided portion.

C-6: Modification 6

In the above first and second embodiments, data transmission software is stored in advance in nonvolatile memory 120b for realizing functions of the transmitter device according to the present invention. However, the data transmission software may be stored in a computer device readable recording medium such as a CD-ROM (Compact Disk Read Only Memory), such that the data transmission software is installed in a general computer device. Thus, a transmitter device in an existing communication system can be provided with the same functions as the transmitter device of the present invention.

The invention claimed is:

1. A transmitter device comprising:
a control unit configured to generate a plurality of data blocks;
a communication interface configured to transmit to a receiver device, through a communication network, said data blocks in succession up to a predetermined amount, after sequence information is written into each of said data blocks by said control unit, said sequence information comprising an indication of an order of said data blocks;
said communication interface configured to receive from said receiver device an acknowledgement that acknowledges receipt of one or more of said data blocks, said acknowledgement containing sequence information of a subsequent data block expected to be received next by said receiver device;

said control unit further configured to direct said communication interface to retransmit at least one of said data blocks in response to expiration of a retransmission timeout without receipt of said acknowledgement containing sequence information of said subsequent data block expected to be received next by said receiver device after receipt of said at least one of said data blocks; and said control unit further configured, in response to retransmission of said at least one of said data blocks, to direct said communication interface to transmit subsequent data blocks that are awaiting initial transmission, transmission of said subsequent data blocks limited to a predetermined number by said control unit until receipt, after retransmission of said at least one of said data blocks, of said acknowledgement containing sequence information of said at least one of said data blocks.

2. The transmitter device according to claim 1, wherein said control unit is further configured to discard any said acknowledgement transmitted from said receiver device as a response to receipt of a data block that has been duplicated or fragmented during transmission in said communication network, as indicated to said control unit by information contained in said acknowledgment.

3. The transmitter device according to claim 1, wherein said control unit is further configured to direct said communication interface to retransmit said at least one of said data blocks again in a case that it is determined, based on information contained in said acknowledgment, that said at least one of said data blocks is not received by said receiver device, and that said subsequent data blocks transmitted after said retransmission of said at least one of said data blocks are received by said receiver device.

4. The transmitter device according to claim 1, wherein said control unit is further configured to determine a quantity of duplicate acknowledgements received by said communication interface, each of said duplicate acknowledgments containing sequence information of said at least one of said data blocks; and said control unit is further configured to direct said communication interface to retransmit said at least one of said data blocks again in response to said quantity of duplicate acknowledgements exceeding a number of said subsequent data blocks that have been transmitted.

5. The transmitter device according to claim 1, wherein said control unit is further configured to measure a length of time from when said at least one of said data blocks is retransmitted; and said control unit is further configured to direct said communication interface to retransmit said at least one of said data blocks again in response to said length of time reaching a predetermined period of time without receipt by said communication interface of said acknowledgement containing sequence information of said subsequent data block expected to be received next by said receiver device after receipt of said at least one of said data blocks.

6. A transmitter device comprising:

a control unit configured to direct transmission of data blocks to a receiver device, through a communication network, said data blocks transmitted in succession up to an amount defined by a congestion window size, after sequence information is written into each of said data blocks by said control unit, said sequence information showing an order of said data blocks;

a communication unit in communication with said control unit, said communication unit configured to receive from said receiver device an acknowledgement that acknowledges receipt of one or more of said data blocks, said acknowledgement containing sequence information of a subsequent data block expected to be received next by said receiver device;

said control unit further configured to direct said communication unit to retransmit at least one of said data blocks in response to expiration of a retransmission timeout without receipt of said acknowledgement containing sequence information of said subsequent data block expected to be received next by said receiver device after receipt of said at least one of said data blocks;

said control unit further configured to reduce said congestion window size to a predetermined value in response to retransmission of said at least one of said data blocks; and said control unit further configured to increase said congestion window size according to a predetermined algorithm and direct said communication unit to transmit subsequent data blocks awaiting initial transmission in response to receipt by said control unit of said acknowledgement containing sequence information of said at least one of said data blocks after retransmission of said at least one of said data blocks.

7. The transmitter device according to claim 6, wherein said control unit is further configured to discard any said acknowledgement transmitted from said receiver device as a response to receipt of a data block that has been duplicated or fragmented during transmission in said communication network, as indicated to said control unit by information contained in said acknowledgment.

8. The transmitter device according to claim 6, wherein said control unit is further configured to direct said communication interface to retransmit said at least one of said data blocks again in a case that it is determined, based on information contained in said acknowledgment, that said at least one of said data blocks is not received by said receiver device, and that said subsequent data blocks transmitted after said retransmission of said at least one of said data blocks are received by said receiver device.

9. The transmitter device according to claim 6, wherein said control unit is further configured to determine a quantity of duplicate acknowledgements received by said communication interface, said duplicate acknowledgements each containing sequence information of said at least one of said data blocks; and said control unit is further configured to direct said communication interface to retransmit said at least one of said data blocks again in response to said quantity of duplicate acknowledgements exceeding a number of said subsequent data blocks that have been transmitted.

10. The transmitter device according to claim 6, wherein said control unit is further configured to measure a length of time between retransmission of said at least one of said data blocks and receipt of said acknowledgement containing sequence information of said subsequent data block expected to be received next by said receiver device after receipt by said receiver device of said at least one of said data blocks; and said control unit is further configured to direct said communication unit to retransmit said at least one of said data blocks again in response to said length of time reaching a predetermined period of time without receipt of said acknowledgement containing sequence information of said subsequent data block expected to be received next by said receiver device after receipt by said receiver device of said at least one of said data blocks.

11. The transmitter device according to claim 6, wherein said control unit is further configured to increase said congestion window size based on a number of times said acknowledgement containing sequence information of said at least one of said data blocks is received by said communication unit.

12. A transmitter device comprising:
a storage unit;
a communication unit; and
a control unit in communication with said storage unit and said communication unit, said control unit configured to direct said communication unit to transmit to a receiver device, through a communication network, data blocks in succession up to an amount defined by a congestion window size, after sequence information is written into each of said data blocks by said control unit, said sequence information comprising an indication of an order of said data blocks;
said communication unit configured to receive from said receiver device an acknowledgement that acknowledges receipt of one or more of said data blocks, said acknowledgement containing sequence information of a subsequent data block expected to be received next by said receiver device;
said control unit further configured to direct said communication unit to retransmit at least one of said data blocks in response to receipt, a predetermined number of times, of said acknowledgement containing similar sequence information, said similar sequence information identifying said at least one of said data blocks;
said control unit further configured to measure a length of time between retransmission of said at least one of said data blocks and receipt of an acknowledgement that acknowledges receipt of said at least one of said data blocks;
said control unit further configured to direct said communication unit to repeat retransmission of said at least one of said data blocks in response to said length of time reaching a predetermined period of time without receipt of said acknowledgement that acknowledges receipt of said at least one of said data blocks;
said control unit further configured to reduce said congestion window size in response to retransmission of said at least one of said data blocks, said congestion window size reduced by said control unit after a current value of said congestion window size is stored in said storage unit by said control unit;
said control unit further configured to increase said congestion window size to an initial value determined based on said current value of said congestion window size stored in said storage unit; and
said control unit further configured to direct said communication unit to transmit subsequent data blocks awaiting initial transmission in response to receipt of an acknowledgement containing sequence information of said retransmitted one of said data blocks, after retransmission of said at least one of said data blocks.

13. The transmitter device according to claim 12, wherein said control unit is further configured to increase said congestion window size based on a number of times said acknowledgement containing sequence information of said at least one of said data blocks is received by said communication unit.

14. A non-transitory computer readable storage medium encoded with computer executable instructions for causing a computer device to execute:
a process of transmitting to a receiver device, through a communication network, data blocks in succession up to a predetermined amount, after writing sequence information to each of said data blocks, said sequence information comprising an indication of an order of said data blocks;
a process of receiving from said receiver device an acknowledgement that acknowledges receipt of one or more of said data blocks, said acknowledgement containing sequence information of a subsequent data block expected to be received next by said receiver device;
a process of retransmitting at least one of said data blocks in response to expiration of a retransmission timeout before receipt of said acknowledgment of receipt of said at least one of said data blocks by said receiver device; and
a process of transmitting a limited number of subsequent data blocks that are awaiting initial transmission after retransmission of said at least one of said data blocks is performed, transmission of said limited number of said subsequent data blocks limited to a predetermined number until said acknowledgement containing sequence information of said at least one of said data blocks is received from said receiver device.

15. A non-transitory computer readable storage medium encoded with computer executable instructions for causing a computer device to execute:
a process of transmitting to a receiver device, through a communication network, data blocks in succession up to an amount defined by a congestion window size, after writing sequence information to each of said data blocks, said sequence information comprising an indication of an order of said data blocks;
a process of receiving from said receiver device an acknowledgement that acknowledges receipt of one or more of said data blocks, said acknowledgement containing sequence information of a subsequent data block expected to be received next by said receiver device;
a process of retransmitting at least one of said data blocks in response to expiration of a retransmission timeout before receipt of said acknowledgment of receipt of said at least one of said data blocks by said receiver device; and
a process of reducing said congestion window size to a predetermined value in response to retransmission of said at least one of said data blocks; and
a process of increasing said congestion window size according to a predetermined algorithm and transmitting subsequent data blocks awaiting initial transmission in response to receipt of said acknowledgement containing sequence information of said at least one of said data blocks, after retransmission of said at least one of said data blocks.

16. The non-transitory computer readable storage medium according to claim 15,
wherein said process for increasing said congestion window size is based on a number of times said acknowledgement containing sequence information of said at least one of said data blocks is received.

17. A non-transitory computer readable storage medium encoded with computer executable instructions for causing a computer device to execute:
a process of transmitting to a receiver device, through a communication network, data blocks in succession up to an amount defined by a congestion window size, after sequence information is written into each of said data blocks, said sequence information showing an order of said data blocks;

a process of receiving from said receiver device an acknowledgement that acknowledges receipt of one or more of said data blocks, said acknowledgement containing sequence information of a subsequent data block expected to be received next by said receiver device;

a process of retransmitting at least one of said data blocks containing respective sequence information a first time in response to receipt, a predetermined number of times, of said acknowledgement containing said respective sequence information of said at least one of said data blocks;

a process of measuring a length of time between retransmission of said at least one of said data blocks said first time and receipt of an acknowledgement that acknowledges receipt of said at least one of said data blocks;

a process of retransmitting said at least one of said data blocks a second time in response to said length of time reaching a predetermined period of time without receipt of said acknowledgement that acknowledges receipt of said at least one of said data blocks;

a process of storing a current value of said congestion window size in a storage unit and of reducing said congestion window size in response to retransmission of said at least one of said data blocks said second time, said congestion window size reduced after said current value of said congestion window size is stored in said storage unit; and a process of increasing said congestion window size to an initial value determined based on said current value of said congestion window size stored in said storage unit and transmitting subsequent data blocks awaiting initial transmission after said at least one of said data blocks is retransmitted said second time, and said acknowledgement containing sequence information of said at least one of said data blocks is received from said receiver device.

18. The non-transitory computer readable storage medium according to claim 17, wherein said process of increasing said congestion window size is based on a number of times said acknowledgement containing sequence information of said at least one of said data blocks is received.

* * * * *